Jan. 27, 1942.  H. W. VOKES  2,271,239
NONREFLECTING COATING FOR GLASS
Filed Sept. 28, 1940

TO VACUUM PUMP

HOWARD. W. VOKES
INVENTOR

BY *Newton M. Powers*

ATTORNEY

Patented Jan. 27, 1942

2,271,239

UNITED STATES PATENT OFFICE 2,271,239

NONREFLECTING COATING FOR GLASS

Howard W. Vokes, Rochester, N. Y., assignor to Eastman Kodak Company, Rochester, N. Y., a corporation of New Jersey Application September 28, 1940, Serial No. 358,850

6 Claims. (Cl. 91—12.2)

This invention relates to apparatus and processes for coating the surface of glass with interference layers to prevent Fresnel reflections.

One form of reflection obviating layer, namely metallic fluoride on glass, has been proposed by Professor Strong in the Journal of the Optical Society of America, January 1936, vol. 26, page 73, wherein he refers to the maxima and minima of the reflection as the film thickness varies and points out that the minima is zero only when the index of the coating is the square root of the index of the glass, making his two interface reflections equal. The present invention relates to apparatus for coating the lenses according to Strong's process or according to any of the modifications thereof, of which many have been proposed.

It is an object of the invention to provide an apparatus whereby coatings may be made more accurately and more quickly than hitherto.

It is an object of the invention to provide apparatus which is easy to clean between consecutive coatings.

It is an object of one embodiment of the invention to reduce the area which has to be cleaned between coatings.

It is the ultimate object of the invention to speed up the process which eliminates uneven coatings such as those which result when flakes of the fluoride which have previously been deposited on the instrument break loose therefrom and fall to the surface of the glass which is supposed to receive the coating.

In the practice of coating processes such as described by Strong, a lens, or group of lenses, is suitably mounted in a bell jar at a predetermined distance from and in unobstructed view of a filament which holds the metallic fluoride and from which this fluoride evaporates onto any and all surfaces (the total distances in the bell jar being small) in unobstructed view thereof. The bell jar is evacuated before coating the lenses and must be re-evacuated between each batch of lenses. The bell jar and supports inside are usually all of metal, glass, or hard electrical insulating material. After several batches have been run, the coating of the fluoride on the inside walls of the bell jar reduces the ease of viewing the operation. However this trouble is not as serious as is the fact that the corresponding coating of the metal surfaces is liable to flake off and to spoil the coating of one or more of the lenses.

Therefore, the inside of the bell jar and particularly the metal surfaces of the container or the supports must be cleaned periodically. I usually perform this cleanup after every half dozen or so batches. I have found that the coating can be removed fairly easily from the glass, but that it adheres tenaciously to some points on the metal, only to flake off during subsequent coatings.

According to the invention, I have remedied this trouble and speeded up the clean-up process, until the time consumed is practically negligible, by plating practically all the metal surfaces in the container with nickel or chromium, preferably the latter. The metal surfaces should be smooth (highly polished) before plating. The chromium plated surface cleans even easier than the glass.

Since the fluoride coating is practically entirely on areas in unobstructed view of the filament, it is those areas of the metal surfaces which have the greatest need for the chromium plating. Generally I plate every metal surface that goes inside the bell jar and that can be plated in a reasonable manner.

According to one embodiment of the invention, I further reduce the time consumed in clean-up by reducing the area of the surfaces which are in unobstructed view of the filament. The lenses are usually below the filament and of course nothing must be placed between them and the filament. By placing a shield in the form of an inverted glass beaker over the filament, the fluoride coating is prevented from reaching the top of the bell jar and is restricted to the inside of the beaker, the lens and surrounding support and possibly to a narrow band around the bell jar itself which band can be viewed by the filament between the support and the rim of the inverted beaker. With this arrangement, the transparency of the top of the bell jar is never spoiled and by merely putting in a clean beaker after every few coating runs, the visibility of the filament is assured. If lenses are held both above and below the filament, as described in copending application Serial No. 358,846 filed by Daniel B. McRae concurrently herewith, the shield should be a cylinder. Thus, the shield is close to the sides of the filament which sides are the ones not facing the lenses being coated. The shield is preferably transparent.

Other objects and advantages of the invention will be apparent from the following description when read in connection with the accompanying drawing, in which.

Figure 1:
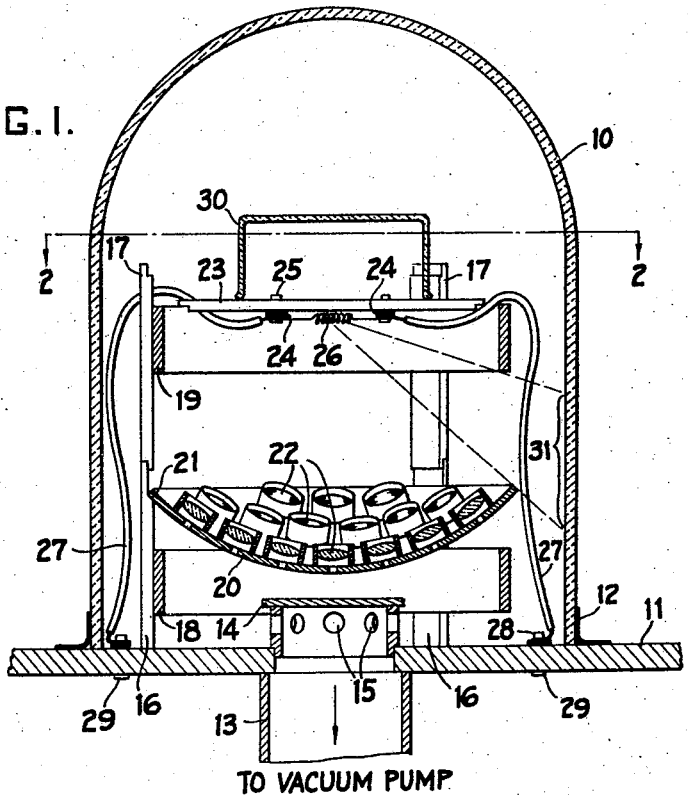
Fig. 1 is a cross section in elevation of apparatus incorporating the invention.

In Fig. 1 a bell jar 10 supported on a metal plate 11 is provided with a circular strip of rubber 12 as a seal and may be evacuated through a pipe 13 by a vacuum pump not shown. A cap 14 for the pipe 13 is provided with openings 15 through which the air from the bell jar 10 may be evacuated.

Positioned in this bell jar is a framework consisting of three legs 16 carried by a ring 18, and supporting three similar legs 17 carried by a ring 19. The lower half of this framework made up of the legs 16 and ring 18 supports a spherical disk 20 by means of three recessed portions 21 in the legs 16. This spherical disk carries lenses 22 as shown, the surfaces of which are to be coated with a non-reflecting layer.

Figure 2:
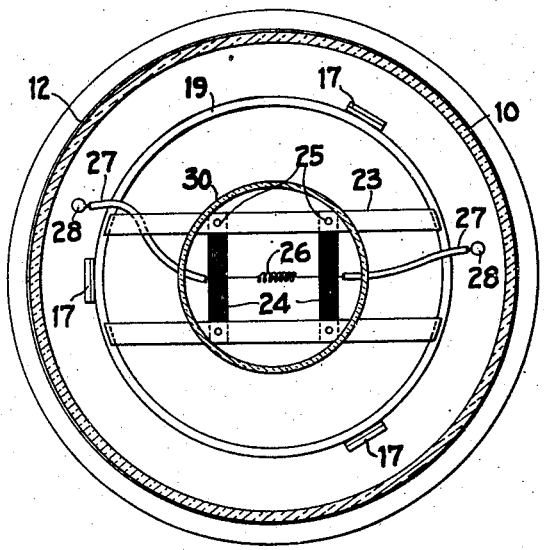
Fig. 2 is a horizontal cross section of the apparatus shown in Fig. 1.

The upper half of the framework consisting of the legs 17 and the ring 19 carries two cross members 23 as best shown in Fig. 2, to which by means of bolts or rivets 25 are attached two insulating cross arms 24 on which is supported a filament 26. This filament is to carry the fluoride during the evaporation thereof. Wires 27 carrying the necessary current to the filament 26 connect this filament through suitable insulated binding posts 28 to outside binding posts 29 at which point the current supply is connected to the apparatus. The filament 26 is at the center of the spherical shell 20, so that all of the lenses 22 are equidistant from the filament 26 which results in coatings of equal thickness on all of the lenses.

The fluoride being evaporated from the filament 26 travels in substantially straight lines outward from the filament and coats any surface in unobstructed view of this filament. Incidentally some of the material seems to get around onto other surfaces which are not in unobstructed view of the filament, but this effect is practically negligible. Thus not only the surfaces of the lenses 20 receive the fluoride coating, but also the surface of the metallic shell 20, the inside surface of the legs 16 and 17, the inside surface of the ring 19, certain surfaces of the cross-bars 23 and 24 and part of the inner surface of the bell jars 10. Since the shell 20 does not come all the way up to the ring 19, a band 31 on the inner surface of the bell jar 10 receives considerable coating. According to the invention, all of the metallic surfaces in unobstructed view of the filament 26, (or better still practically all the metal surfaces exposed inside the container 10) are plated with chromium or nickel. This includes the inside surface of the ring 19, the inside surfaces of the legs 16 and 17 and the inside surface of the shell 20 and the surfaces of the cross arms 23.

If only the elements so far described in connection with the drawing, were used, the upper portions of the bell jar 10 would become coated and would require frequent cleaning if the process is to be easily observed. Because of its size, the upper portions of the inside surface of the bell jar 10 are not easy to reach and are hence difficult to clean. According to a preferred embodiment of the invention, the coating of this portion of the bell jar is prevented and the total areas requiring cleaning are considerably reduced by placing a beaker 30 in an inverted position on the cross arms 23. This beaker acts as a shield and may be replaced after every two or three coatings, by a clean one and hence the total elapsed time of clean-up is reduced to a minimum.

By my invention, the total clean-up time is reduced from about half an hour to a minute or so and thus the cost of coating lenses is considerably reduced.

Having thus described my invention, I wish to point out that it is not limited to this specific structure, but is of the scope of the appended claims.

What I claim and desire to secure by Letters Patent of the United States is:

1. Apparatus for holding lenses during surface coating thereof with a fluoride, comprising a container adapted to be evacuated, means in the container for the vaporization of the fluoride, means for supporting a lens inside the container, to receive the fluoride coating said container and supporting means consisting at least partly of metal, the major portion of the surfaces of said metal which are exposed inside said container being smooth and plated with a metal from the group consisting of chromium and nickel.

2. Apparatus according to claim 1 in which the plated metal is chromium.

3. Apparatus for holding lenses during surface coating thereof with a fluoride, comprising a container, a filament supported inside the container for holding and vaporizing the fluoride for the coating and means for supporting a lens in the container in unobstructed view of said filament, the container and said supporting means consisting at least partly of metal and all surfaces of the metal which are in view of the filament being smooth and plated with a metal from the group consisting of nickel and chromium.

4. Apparatus according to claim 3 in which the plated metal is chromium.

5. Apparatus for holding lenses during surface coating thereof by the evaporation of a fluoride thereon, comprising a container adapted to be evacuated, a filament supported inside the container for holding the fluoride, and means for supporting a lens in the container in unobstructed view of said filament, the supporting means and container being made of metal and glass and all surfaces of the metal which are in view of the filament being smooth and plated with a metal from the group consisting of nickel and chromium.

6. Apparatus for holding lenses during surface coating by the evaporation of a fluoride thereon comprising a container adapted to be evacuated, a filament supported inside the container for holding the fluoride, and means for supporting a lens in the container in unobstructed view of said filament, the supporting means and container being made of metal and glass and all surfaces of the metal which are in unobstructed view of the filament being smooth and chromium plated.

HOWARD W. VOKES.